United States Patent
Ishikawa et al.

(10) Patent No.: US 7,753,796 B2
(45) Date of Patent: Jul. 13, 2010

(54) GAME DEVICE, GAME DEVICE CONTROL METHOD, PROGRAM, PROGRAM DISTRIBUTION DEVICE, INFORMATION STORAGE MEDIUM

(75) Inventors: Hirotaka Ishikawa, Tokyo (JP); Yasumi Takase, Tokyo (JP); Kazuhiko Nobe, Tokyo (JP); Kei Nagaoka, Tokyo (JP); Tomomi Shigura, Tokyo (JP); Toshiaki Kishino, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 853 days.

(21) Appl. No.: 10/527,067

(22) PCT Filed: Jun. 18, 2003

(86) PCT No.: PCT/JP03/07727

§ 371 (c)(1),
(2), (4) Date: Mar. 9, 2005

(87) PCT Pub. No.: WO2004/024263

PCT Pub. Date: Mar. 25, 2004

(65) Prior Publication Data

US 2006/0063573 A1     Mar. 23, 2006

(30) Foreign Application Priority Data

Sep. 13, 2002    (JP) ............................. 2002-269161

(51) Int. Cl.
*A63F 9/24*       (2006.01)
*A63F 13/00*      (2006.01)
*G06F 17/00*      (2006.01)
*G06F 19/00*      (2006.01)
*G10L 15/00*      (2006.01)

(52) U.S. Cl. ..................... 463/43; 704/231; 704/246; 704/251

(58) Field of Classification Search ................... 463/43; 704/231, 246, 251; 376/406.03
See application file for complete search history.

(56) References Cited

U.S. PATENT DOCUMENTS 4,763,278 A * 8/1988 Rajasekaran et al. ........ 704/251

(Continued)

FOREIGN PATENT DOCUMENTS

EP       0 762 709 A    3/1997

(Continued)

OTHER PUBLICATIONS

Final Fantasy VII, Sep. 7, 1997, Squaresoft.*

(Continued)

*Primary Examiner*—John M Hotaling
*Assistant Examiner*—Kevin Y. Kim
(74) *Attorney, Agent, or Firm*—Sughrue Mion, PLLC (57) ABSTRACT

The present invention provides a game device that can display strings more suited to speech recognition at the time of speech input. A priority input device information acquisition unit (56) acquires priority input device information. When the priority input device information represents a character input device, an input criteria display unit (58) and a determination unit (60) display character input criteria as input criteria and determine whether or not that input corresponds to the input criteria. When the priority input device information represents a speech input device, the input criteria display unit (58) and the determination unit (60) display character input criteria as input criteria, and in regard to predetermined character input criteria, display speech input criteria corresponding to the character input criteria as input criteria, and determine whether or not that input corresponds to speech recognition data corresponding to the input criteria. A controller (62) controls the game on the basis of the determination result.

13 Claims, 8 Drawing Sheets

U.S. PATENT DOCUMENTS

| | | | |
|---|---|---|---|
| 5,615,296 A * | 3/1997 | Stanford et al. | 704/270.1 |
| 5,673,401 A * | 9/1997 | Volk et al. | 725/139 |
| 5,696,962 A * | 12/1997 | Kupiec | 707/4 |
| 5,861,821 A * | 1/1999 | Kato et al. | 341/22 |
| 5,884,265 A | 3/1999 | Squitteri et al. | |
| 6,077,164 A * | 6/2000 | Liu | 463/36 |
| 6,125,341 A | 9/2000 | Raud et al. | |
| 6,173,266 B1 | 1/2001 | Marx et al. | |
| 6,544,123 B1 * | 4/2003 | Tanaka et al. | 463/36 |
| 6,676,523 B1 * | 1/2004 | Kasai et al. | 463/43 |
| 7,147,562 B2 * | 12/2006 | Ohara et al. | 463/42 |
| 2001/0053969 A1 * | 12/2001 | Hogenhout et al. | 704/9 |

FOREIGN PATENT DOCUMENTS

| | | | |
|---|---|---|---|
| EP | 0 850 673 A | 7/1998 |
| EP | 850673 A1 | 7/1998 |
| EP | 1 020 789 A1 | 7/2000 |
| EP | 1 127 595 A | 8/2001 |
| EP | 1127595 A1 | 8/2001 |
| EP | 1219331 A2 | 7/2002 |
| JP | 2000-181897 A | 6/2000 |
| JP | 2002-35421 A | 2/2002 |
| WO | WO 00/22609 A | 4/2000 |
| WO | 00/31727 | 6/2000 |

OTHER PUBLICATIONS

International Search Report for PCT/JP2003/07727 dated Sep. 16, 2003.
Dan Newman, Dragon Naturally Speaking 6, User's Guide, ScanSoft, pp. 83-93, 105-115, 217-233 and 243-245.
European Office Action dated Jan. 12, 2010 in the counterpart application European Patent Application No. 03736236.5.
IBM Technical Disclosure Bulletin, vol. 33, No. 11, Apr. 1991 Integrated Audio-Graphics User Interface, pp. 368-371.

* cited by examiner

FIG. 3

| OPTION ID | BASIC STRING | SUBSTITUTE STRING | SPEECH RECOGNITION DATA |
|---|---|---|---|
| 001 | SHAKE! | I SAID SHAKE! | SPEECH RECOGNITION DATA OF "I SAID SHAKE!" |
| 002 | SIT! | | SPEECH RECOGNITION DATA OF "SIT!" |
| 003 | JUMP! | | SPEECH RECOGNITION DATA OF "JUMP!" |
| | | | |

GAME DEVICE, GAME DEVICE CONTROL METHOD, PROGRAM, PROGRAM DISTRIBUTION DEVICE, INFORMATION STORAGE MEDIUM

TECHNICAL FIELD

The present invention relates to a game device, a game device control method, a program, a program distribution device and an information storage medium.

BACKGROUND ART

A game device is known which displays, to a player, strings as input criteria, compares the input criteria with input by the player, and controls a game (e.g., controls the progress of a story) on the basis of the comparison result.

When such a game device is configured so that the input by the player can be conducted with a speech input device, the game enjoyableness and operability can be improved, but depending on the strings displayed as the input criteria, there are instances where these are not suited to the speech input device. For example, when the length of the strings is short, there are problems such as the speech recognition rate dropping.

The present invention has been conceived in view of the above, and aims to provide a game device, a game control method, a program, a program distribution device and an information storage medium that can display strings more suited to speech recognition at the time of speech input.

DISCLOSURE OF THE INVENTION

In order to solve the above problems, a game device of the present invention comprises: priority input device information acquisition means for acquiring priority input device information; character input processing means which, when the priority input device information acquired by the priority input device information acquisition means represents a character input device, displays character input criteria as input criteria, determines whether or not that input corresponds to the input criteria, and controls a game on the basis of the determination result; and speech input processing means which, when the priority input device information acquired by the priority input device information acquisition means represents a speech input device, displays character input criteria as input criteria, and in regard to predetermined character input criteria, displays speech input criteria corresponding to the character input criteria as input criteria, determines whether or not that input corresponds to speech recognition data corresponding to the input criteria, and controls the game on the basis of the determination result.

Also, a control method for a game device of the present invention comprises: a priority input device information acquisition step of acquiring priority input device information; a character input processing step which, when the priority input device information acquired in the priority input device information acquisition step represents a character input device, displays character input criteria as input criteria, determines whether or not that input corresponds to the input criteria, and controls a game on the basis of the determination result; and a speech input processing step which, when the priority input device information acquired in the priority input device information acquisition step represents a speech input device, displays character input criteria as input criteria, and in regard to predetermined character input criteria, displays speech input criteria corresponding to the character input criteria as input criteria, determines whether or not that input corresponds to speech recognition data corresponding to the input criteria, and controls the game on the basis of the determination result.

Also, a program of the present invention is a program for causing a computer to function as a game device, such as a home-use game device, a commercial-use game device, a portable game device, a portable telephone device or a personal computer, which causes the computer to function as: priority input device information acquisition means for acquiring priority input device information; character input processing means which, when the priority input device information acquired by the priority input device information acquisition means represents a character input device, displays character input criteria as input criteria, determines whether or not that input corresponds to the input criteria, and controls a game on the basis of the determination result; and speech input processing means which, when the priority input device information acquired by the priority input device information acquisition means represents a speech input device, displays character input criteria as input criteria, and in regard to predetermined character input criteria, displays speech input criteria corresponding to the character input criteria as input criteria, determines whether or not that input corresponds to speech recognition data corresponding to the input criteria, and controls the game on the basis of the determination result. The program may be configured so that it is stored in an information recording medium such as a CD-ROM, a DVD (trademark) or a memory card.

In the present invention, priority input device information is acquired. Here, the priority input device information is information representing which input device connected to the game device is to be given priority (used). When the priority input device information represents a character input device, character input criteria are displayed as input criteria, it is determined whether or not that input corresponds to the input criteria, and the game is controlled on the basis of the determination result. When the priority input device information represents a speech input device, character input criteria are displayed as input criteria, and in regard to predetermined character input criteria, speech input criteria corresponding to the character input criteria are displayed as input criteria, it is determined whether or not that input corresponds to speech recognition data pertaining to the input criteria, and the game is controlled on the basis of the determination result. Here, the predetermined character input criteria may be character input criteria not suited to speech input, for example (character input criteria where the speech recognition rate drops due to the string length being short). Also, the speech input criteria may be input criteria where predetermined strings are attached to character input criteria, for example. The speech input criteria may also be input criteria where character input criteria are plurally repeated. The speech input criteria may also be input criteria where a name that the player has set is attached to character input criteria. The speech input criteria may also be combinations of these.

According to the present invention, when the priority input device information represents a speech input device, in regard to predetermined character input criteria, speech input criteria corresponding to the character input criteria are displayed as input criteria, and the determination with respect to the input can be done on the basis of speech recognition data corresponding to the speech input criteria. By configuring the invention in this manner, input criteria more suited to speech input can be displayed in place of input criteria not suited to speech input at the time of speech input.

Also, a game device of the present invention comprises: basic string storage means for storing a plurality of basic strings; substitute string storage means for storing a substitute string corresponding to each of at least some of the plurality of basic strings stored in the basic string storage means; speech recognition data storage means which, in regard to basic strings to which the substitute string has not been stored correspondingly in the substitute string storage means of the plurality of basic strings stored in the basic string storage means, stores speech recognition data corresponding to the basic string in a manner corresponding to each of those basic strings, and in regard to basic strings to which the substitute string has been stored correspondingly in the substitute string storage means of the plurality of basic strings stored in the basic string storage means, stores speech recognition data corresponding to the substitute string in a manner corresponding to each of those basic strings; priority input device information acquisition means for acquiring priority input device information; input criteria display means which, when the priority input device information acquired by the priority input device information acquisition means represents a character input device, displays, as input criteria, the basic strings stored, in the basic string storage means, and when the priority input device information acquired by the priority input device information acquisition means represents a speech input device, in regard to the basic strings to which the substitute string has not been stored correspondingly in the substitute string storage means of the plurality of basic strings stored in the basic string storage means, displays those basic strings as input criteria, and in regard to the basic strings to which the substitute string has been stored correspondingly in the substitute string storage means of the plurality of basic strings stored in the basic string storage means, displays those substitute strings as input criteria; determination means which, when the priority input device information acquired by the priority input device information acquisition means represents a character input device, determines whether or not the input thereof corresponds to the input criteria displayed by the input criteria display means, and when the priority input device information acquired by the priority input device information acquisition means represents a speech input device, determines whether or not the input thereof corresponds to the speech recognition data correlated with the input criteria displayed by the input criteria display means; and control means for controlling the game on the basis of the result of determination by the determination means.

In this invention, a plurality of basic strings are stored. A substitute string is stored in a manner corresponding to each of at least some of the plurality of basic strings. Moreover, of the plurality of basic strings, in regard to basic strings to which the substitute string has not been stored in a corresponding manner, speech recognition data corresponding to the basic string is stored in a manner corresponding to each of those basic strings, and in regard to basic strings to which the substitute string has been stored in a corresponding manner, speech recognition data corresponding to the substitute string is stored in a manner corresponding to each of those basic strings. Additionally, priority input device information is acquired. When the priority input device information represents a character input device, the basic strings are displayed as input criteria, and it is determined whether or not that input corresponds to the input criteria. When the priority input device information represents a speech input device, in regard to basic strings to which the substitute string has not been stored in a corresponding manner, those basic strings are displayed as the input criteria, and in regard to basic strings to which the substitute string has been stored in a corresponding manner, those substitute strings are displayed as the input criteria, and it is determined whether or not that input corresponds to speech recognition data correlated with the input criteria. Additionally, the game is controlled on the basis of the determination result. Here, the strings include strings of a length of 1, i.e., characters.

According to this invention, when the priority input device information represents a speech input device, in a case where substitute strings have not been correlated and stored, the basic strings are displayed as the input criteria, and in a case where substitute strings have been correlated and stored, the substitute strings are displayed as the input criteria, and it is determined whether or not that input corresponds to speech recognition data correlated with the input criteria. By configuring the invention in this manner, input criteria (strings) more suited to speech input can be displayed in place of input criteria (strings) not suited to speech input at the time of speech input (at the time a speech input device is used).

In one aspect of the invention, the input criteria display means displays the input criteria in a font size according to the priority input device information acquired by the priority input device information acquisition means. By configuring the invention in this manner, the display font size of the input criteria can be changed in accordance with the priority input device information.

Also, in one aspect of the invention, the control means comprises means for controlling the probability of predetermined game events on the basis of the priority input device information acquired by the priority input device information acquisition means. By configuring the invention in this manner, the probability of game events can be controlled in accordance with the priority input device information.

Also, a game device of the present invention comprises: means for acquiring priority input device information; means for displaying input criteria of which at least some are different between when the priority input device information represents a character input device and when the priority input device information represents a speech input device; means for determining, when the priority input device information represents a character input device and when the priority input device information represents a speech input device, whether or not the input thereof corresponds to the different input criteria; and means for controlling a game on the basis of the determination result.

Also, a control method for a game device of the present invention comprises: a step of acquiring priority input device information; a step of displaying, on display means, input criteria of which at least some are different between when the priority input device information represents a character input device and when the priority input device information represents a speech input device; a step of determining, when the priority input device information represents a character input device and when the priority input device information represents a speech input device, whether or not the input thereof corresponds to the different input criteria; and a step of controlling a game on the basis of the determination result.

Also, a program of the present invention is a program for causing a computer to function as a game device, such as a home-use game device, a commercial-use game device, a portable game device, a portable telephone device or a personal computer, comprising: means for acquiring priority input device information; means for displaying input criteria of which at least some are different between when the priority input device information represents a character input device and when the priority input device information represents a speech input device; means for determining, when the priority input device information represents a character input device and when the priority input device information represents a speech input device, whether or not the input thereof corresponds to the different input criteria; and means for controlling a game on the basis of the determination result. The program may be configured so that it is stored in an information recording medium such as a CD-ROM, a DVD (trademark) or a memory card.

In this invention, priority input device information is acquired, and input criteria of which at least some are different between when the priority input device information represents a character input device and when the priority input device information represents a speech input device are displayed. Additionally, it is determined, when the priority input device information represents a character input device and when the priority input device information represents a speech input device, whether or not the input thereof corresponds to the different input criteria. Additionally, the game is controlled on the basis of the determination result. According to this invention, at least some of the input criteria can be changed between the time of character input and the time of speech input. It can also be determined whether or not the character input or the speech input corresponds to the input criteria.

In one aspect of the invention, the game device is connectable to a character input device and a speech input device.

Also, a program distribution device of the present invention is a program distribution device comprising an information storage medium in which is recorded the program of the present invention, reads the program from the information storage medium, and distributes the program at once or divisionally. By all-at-once distribution is meant the entire program is distributed all at once, for example. By divisional distribution is meant that the necessary portions of the program are distributed in response to the stage of game, for example.

BEST MODE FOR CARRYING OUT THE INVENTION

Embodiments of the invention will be described in detail below on the basis of the drawings.

Figure 1:
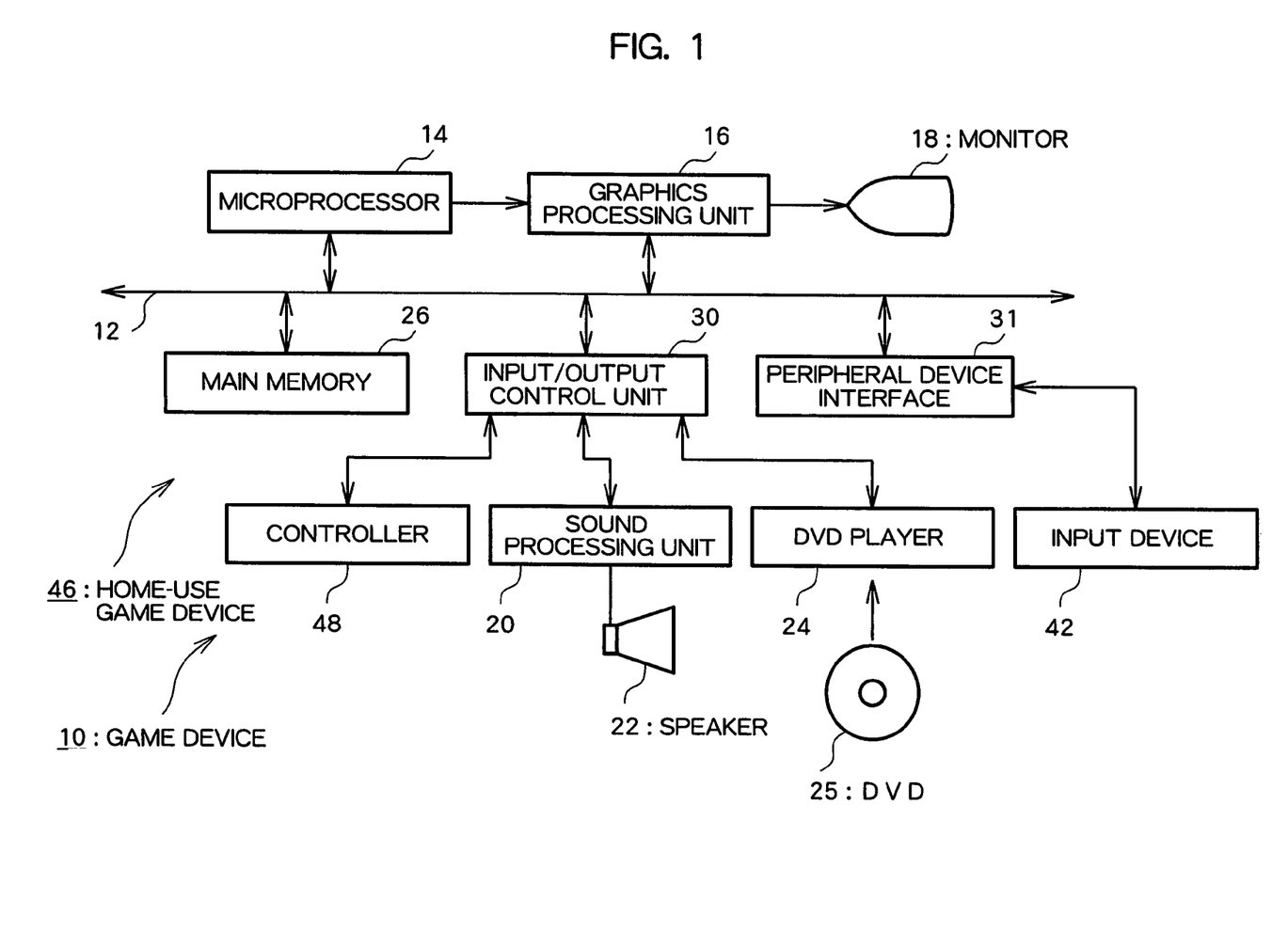
FIG. 1 is a diagram showing the hardware configuration of a game device of an embodiment of the present invention.

FIG. 1 is a diagram showing the hardware configuration of a game device 10. As shown in FIG. 1, the game device 10 is configured by a DVD (Digital Versatile Disk; trademark) 25, which is an information storage medium, being loaded in a home-use game device 46 connected to a monitor 18 and a speaker 22. Here, the DVD 25 is used to supply a game program and game data to the home-use game device 46, but all other information storage media, such as a CD-ROM (Compact Disk—Read Only Memory; trademark) or a ROM (Read Only Memory) card, can be used. The game program and game data can also be supplied from a remote location to the home-use game device 46 via a data communication network such as the Internet.

The home-use game device 46 includes a microprocessor 14, a graphics processing unit 16, a main memory 26, an input/output control unit 30, a peripheral device interface 31, a sound processing unit 20 and a DVD player 24. The microprocessor 14, the graphics processing unit 16, the main memory 26, the input/output control unit 30 and the peripheral device interface 31 are interconnected so as to be capable of mutual data communication using a bus 12. A controller 48, the sound processing unit 20 and the DVD player 24 are connected to the input/output control unit 30. An input device 42 is connected to the peripheral device interface 31. The constituent elements of the home-use game device 46 are housed within a casing. Here, a home-use television receiver is used as the monitor 18, and an internal speaker is used as the speaker 22.

The microprocessor 14 controls each part of the home-use game device 46 on the basis of an operating system stored in an unillustrated ROM and a game program read from the DVD 25. A bus 12 is for exchanging addresses and data between each part of the home-use game device 46. The game program and game data read from the DVD 25 are written as needed in the main memory 26. The graphics processing unit 16 includes a VRAM (Video Random Access Memory), receives image data sent from the microprocessor 14, plots a game screen on the VRAM, converts the content thereof into video signals, and outputs the video signals to the monitor 18.

The input/output control unit 30 is an interface for relaying data communication between microprocessor 14 and the controller 48, the sound processing unit 20 or the DVD player 24. The controller 48 is operation input means for the player to input various game operations. The sound processing unit 20 includes a sound buffer, plays data such as music and game sound effects read from the DVD 25 and stored in the sound buffer, and outputs the music and game sound effects from the speaker 22. The DVD player 24 reads the game program and game data recorded on the DVD 25 in accordance with an instruction from the microprocessor 14. The peripheral device interface 31 is an interface for connecting various peripheral devices to the home-use game device 46; a USB (Universal Serial Bus) interface can be used, for example. Here, a keyboard (character input device) and a microphone (speech input device), for example, are connected to the peripheral device interface 31.

In the present embodiment, a nurture simulation game that nurtures a dog from a puppy to an adult dog is realized by the game device 10 having the above configuration. In this game, a player uses an input device (the input device 42, the controller 48, etc.) to input strings (input criteria) displayed as options on the game screen, where by the player selects the options. Then, when selection of the options is conducted, the game progresses on the basis of the selection results (specifically, the nurture parameters of the dog are changed). In this game, a character input mode and a speech input mode are provided. The character input mode is a game mode where input according to displayed strings is conducted with a character input device. Here, the character input device is an input device with which characters can be inputted, such as a keyboard or a game controller (software keyboard). The speech input mode is a game mode where input according to displayed strings is conducted with a speech input device. It should be noted that this game is realized as a result of the game program supplied to the game device 10 by the DVD 25 or the like being executed.

Figure 2:
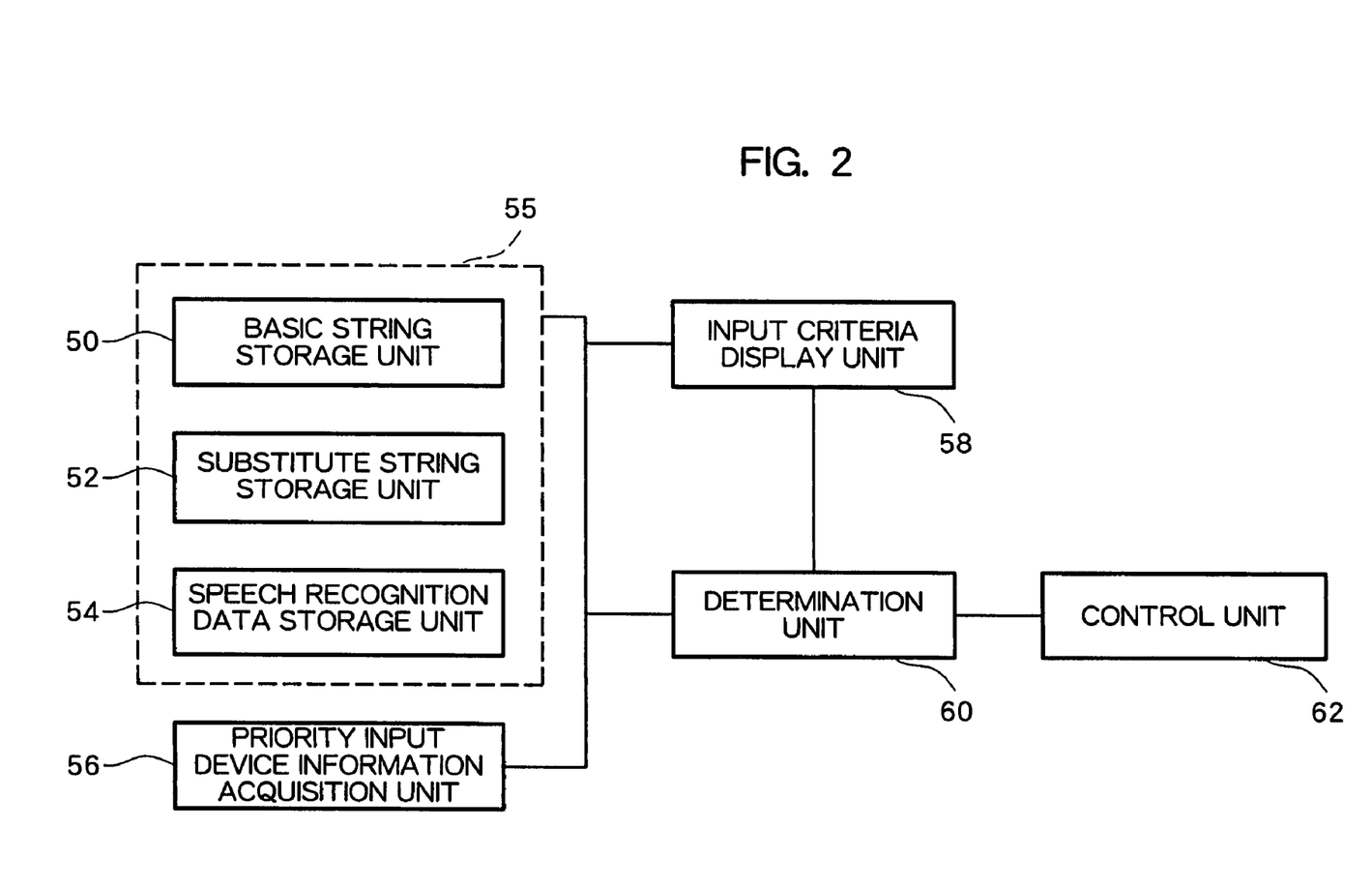
FIG. 2 is a diagram showing functional blocks of the game device of the embodiment of the present invention.

FIG. 2 is a diagram showing, of the functions executed in the game device 10, the functions relating to the invention. These functions are realized by the game device 10 executing the game program. The game program is supplied to a computer by an information storage medium readable by a computer, such as the DVD 25, or a communication network such as the Internet. As shown in FIG. 2, the game device 10 includes a basic string storage unit 50, a substitute string storage unit 52, a speech recognition data storage unit 54, a priority input device information acquisition unit 56, an input criteria display unit 58, a determination unit 60 and a control unit 62.

The basic string storage unit 50, the substitute string storage unit 52 and the speech recognition data storage unit 54 are realized by the DVD 25 and the main memory 26, for example. The basic string storage unit 50 stores basic strings. The substitute string storage unit 52 stores a substitute string in a manner corresponding to each of at least some of the basic strings stored in the basic string storage unit 50. The speech recognition data storage unit 54 stores, in regard to basic strings to which the substitute string has not been stored correspondingly in the substitute string storage unit 52 of the basic strings stored in the basic string storage unit 50, speech recognition data in a manner corresponding to each of those basic strings, and stores, in regard to basic strings to which the substitute string has been stored correspondingly in the substitute string storage unit 52 of the basic strings stored in the basic string storage unit 50, speech recognition data in a manner corresponding to each of those substitute strings. The strings include strings of a length of 1, i.e., characters.

Figure 3:
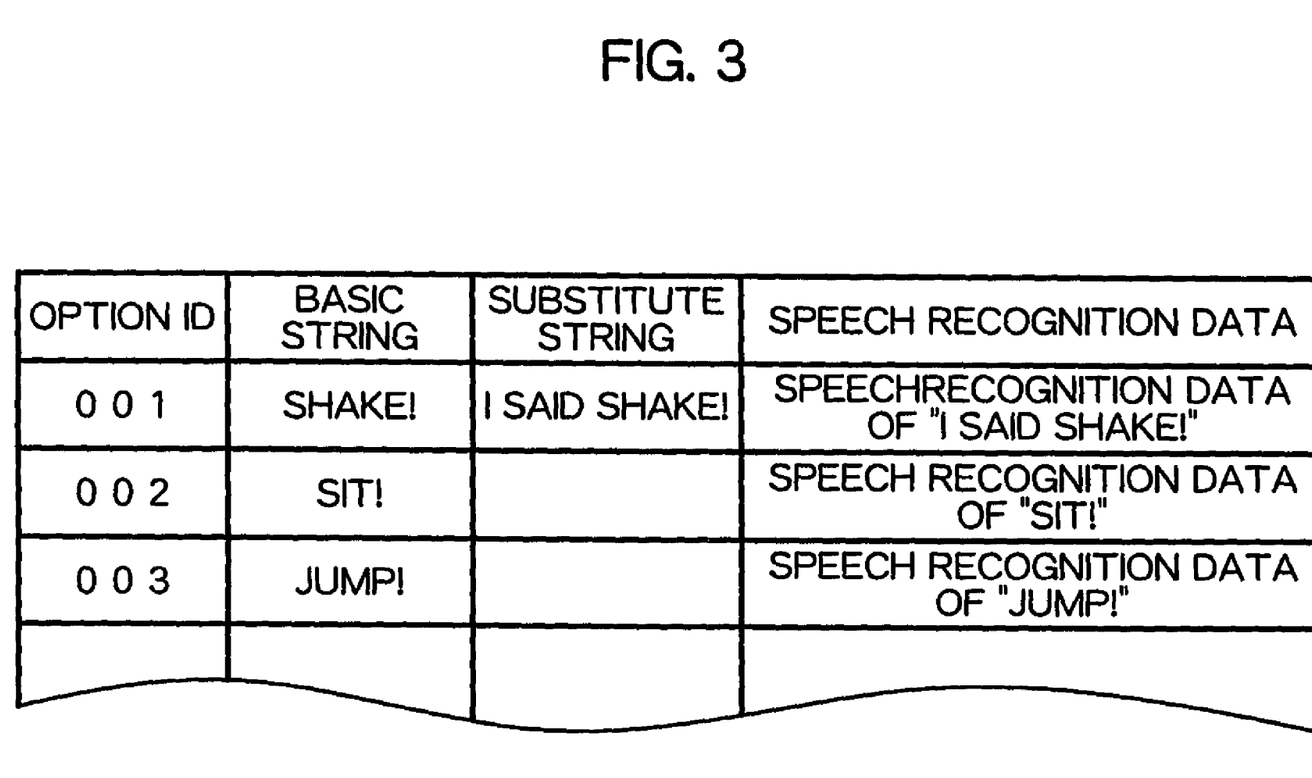
FIG. 3 is a diagram showing an example of an option information table of the embodiment of the present invention.

The storage unit 55 including the basic string storage unit 50, the substitute string storage unit 52 and the speech recognition data storage unit 54 stores an option information table such as shown in FIG. 3, for example. As shown in FIG. 3, the option information table includes option IDs, basic strings, substitute strings and speech recognition data. The option ID is information for identifying each option. In FIG. 3, "Shake!" serving as a basic string, "I said shake!" serving as a substitute string, and "speech recognition data of 'I said shake!'" serving as speech recognition data are correlated with the option ID "001".

The basic strings are used in both the character input mode and the speech input mode, and the substitute strings are used only in the speech input mode. The substitute strings are displayed as options (input criteria) in place of the basic strings during the speech input mode. When substitute strings have not been registered, the basic strings are displayed as options (input criteria) during the speech input mode also. The speech recognition data are used in only the speech input mode, and are audio data corresponding to strings of the basic strings or strings of the substitute strings. When substitute strings have been registered, the speech recognition data are audio data corresponding to the substitute strings, and when substitute strings have not been registered, the speech recognition data are audio data corresponding to the basic strings.

As mentioned previously, in the speech input mode, the player speech-inputs the string of the option that the player wishes to select. In this case, depending on the string displayed as the option, there are instances where this is not suited to speech input. For example, when the length of the string is short, there is usually a tendency for the speech recognition rate to drop, so that even if the option that the player wishes to select is instructed by speech input, it is not recognized that selection of the option has been instructed, which significantly detracts from the game enjoyableness. Thus, the game device 10 is configured to separately store substitute strings in regard to basic strings that have the potential to lead to a drop in the speech recognition rate. Then, the substitute strings are given priority and used in the speech input mode. Namely, when substitute strings exist, the substitute strings are displayed as options, and when substitute strings do not exist, the basic strings are displayed as options.

As shown in FIG. 3, the substitute strings may be configured by attaching predetermined strings to the basic strings. The substitute strings may also be configured by plural repetitions of the basic strings or by attaching a name (e.g., the name of the nurture target game character, such as the name of the dog in the case of the present embodiment) that the player has set to the basic string. The substitute strings may also be configured by combining these. For example, a string where a name that the player has set is attached to the basic string, and where a predetermined string is further attached to this, may also be used as a substitute string. When a string where a name that the player has set is attached to a basic string is used as a substitute string, audio data corresponding to the basic string may be stored in the option information table, and speech recognition data may be generated on the basis of the audio data and the audio data corresponding to the name at the time of speech recognition processing (S302 in FIG. 8).

The priority input device information acquisition unit 56 is realized by the hardware and software centered on microprocessor 14, for example, and acquires priority input device information. The priority input device information represents which input of the input devices (the input device 42, the controller 48, etc.) included in the game device 10 is to be given priority. For example, the priority input device information may be configured so that the player can set the priority input device information on a game environment setting screen. In this case, the priority input device information acquisition unit 56 may be configured to acquire priority input device information set by the player. The priority input device information acquisition unit 56 may also be configured to acquire the priority input device information by detecting the connection status of the input devices. In this case, the priority input device information acquisition unit 56 maybe configured to store, in advance, prioritized order information in a manner corresponding to each of connectable input devices and determine the input device to be used as the priority input device on the basis of this prioritized order information.

The input criteria display unit 58 is realized by the software and hardware centered on the microprocessor 14, the graphics processing unit 16 and the monitor 18, for example. When the priority input device information acquired by the priority input device information acquisition unit 56 represents a character input device (in the character input mode), the input criteria display unit 58 displays, as the input criteria (options), the basic strings stored in the basic string storage unit 50. When the priority input device information represents a speech input device (in the speech input mode), the input criteria display unit 58 displays, as the input criteria, the basic strings to which substitute strings have not been stored correspondingly in the substitute string storage unit 52 of the basic strings stored in the basic string storage unit 50, and displays, as the input criteria, the substitute strings in regard to the basic strings to which substitute strings have been stored correspondingly in the substitute string storage unit 52.

Namely, when the acquired priority input device information represents a character input device, the input criteria display unit 58 displays the basic strings (character input criteria) as the input criteria, and when the acquired priority input device represents a speech input device, the input criteria display unit 58 displays the basic strings (character input criteria) as the input criteria and displays, in regard to predetermined basic strings (character input criteria), the substitute strings (speech input criteria) corresponding to the basic strings (character input criteria) as the input criteria.

The determination unit 60 is realized by the hardware and software centered on the microprocessor 14, for example. When the priority input device information acquired by the priority input device information acquisition unit 56 represents a character input device, the determination unit 60 determines whether or not that input corresponds to the input criteria displayed by the input criteria display unit 58. When the priority input device information represents a speech input device, the determination unit 60 determines whether or not that input corresponds to the speech recognition data correlated with the input criteria displayed by the input criteria display unit 58.

The control unit 62 is realized by the hardware and software centered on the microprocessor 14, for example, and controls the game (e.g., causes the story of the game to progress, changes the parameters of the nurture target game character, etc.) on the basis of the result of determination by the determination unit 60.

The operation of the game device 10 will be described below.

Figure 4:
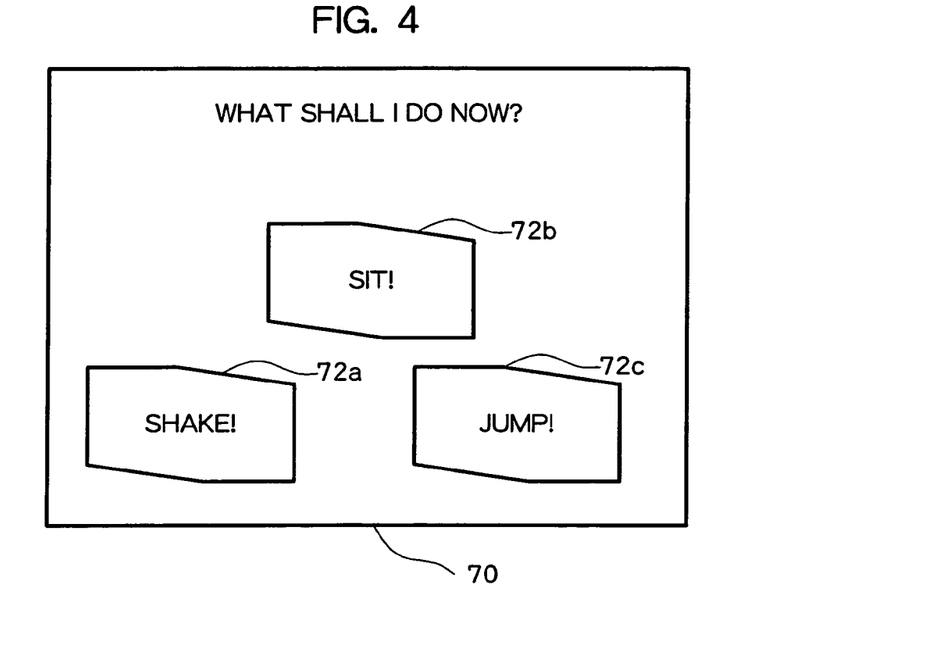
FIG. 4 is a diagram showing an example of a game screen of the embodiment of the present invention.
Figure 5:
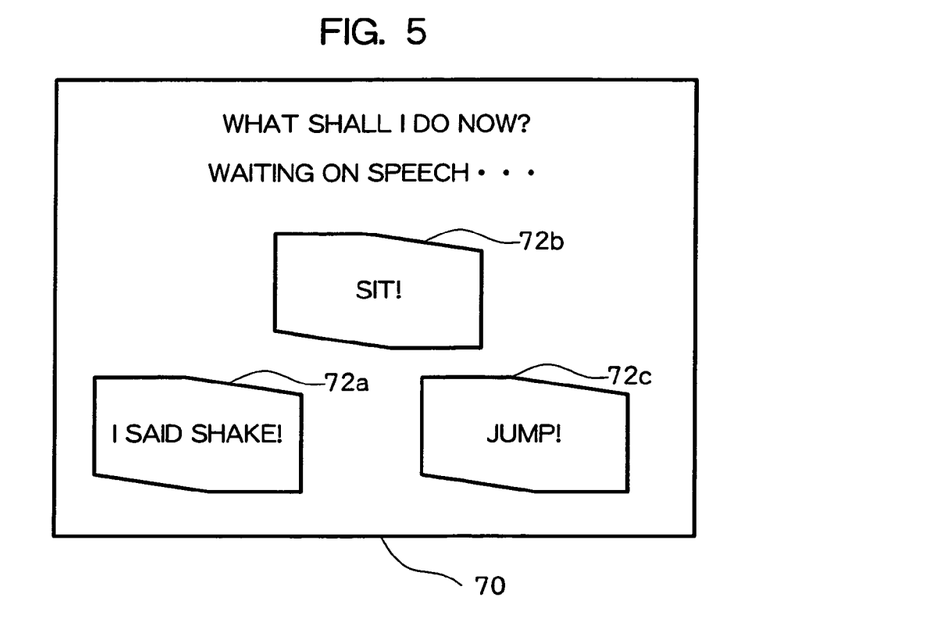
FIG. 5 is a diagram showing an example of a game screen of the embodiment of the present invention.

FIGS. 4 and 5 show examples of a game screen displayed on the monitor 18 of the game device 10 of the present embodiment. FIG. 4 shows an example of the game screen in the character input mode, and FIG. 5 shows an example of the game screen in the speech input mode. Here, description will be given assuming that the options of the string IDs "001" to "003" in the option information table (FIG. 3) are displayed on the game screen.

The game device 10 of the present embodiment is configured so that the player can select the input mode (the selection of the character input mode or the speech input mode) on a game environment setting screen. If the player wishes to use a character input device, then the player selects the character input mode on the game environment setting screen, and if the player wishes to use a speech input device, then the player selects the speech input mode on the game environment setting screen. The game device 10 may be configured so that the game environment setting screen is presented as one option function, for example. The game device 10 may also be configured so that the selection of the input mode is done on the basis of the connection status of the input devices. For example, when a character input device is connected to the game device 10, the character input mode may be automatically selected, and when a speech input device is connected to the game device 10, the speech input mode may be automatically selected. The game device 10 may also be configured so that a prioritized order is stored in regard to each of the input devices and the input mode is selected on the basis of the prioritized order. For example, the prioritized order may be configured so that when a character input device and a speech input device are connected to the game device 10, the speech input mode is selected.

As shown in FIG. 4, options (symbolic images representing options) 72a to 72c are displayed on a game screen 70 in the character input mode. Strings (input criteria), such as "Shake!", "Sit!" and "Jump!", are displayed as the options 72a to 72c. When the string of the option that the player wishes to select among the displayed strings (input criteria) is properly inputted with a character input device, then that option is selected (determined). For example, if the player wishes to select the option "Sit!", then the player inputs "Sit!" with the character input device. The character input mode is configured so that the display of the input criteria is updated each time one character is properly inputted. For example, the character input mode is configured so that when "Si" has been inputted to select the option "Sit!", "t!" is displayed as the input criterion of that option.

As shown in FIG. 5, similar to the character input mode, options (symbolic images representing options) 72a to 72c are displayed on the game screen 70 in the speech input mode. In contrast to the character input mode, "I said shake!" is displayed as the option 72a. The option 72a is displayed in this manner because, as shown in FIG. 3, "I said shake!" is registered in a manner corresponding to the basic string "Shake!". When a voice corresponding to the string of the option that the player wishes to select from among the displayed strings (input criteria) is properly inputted with a speech input device, then that option is selected (determined) For example, if the player wishes to select "I said shake!", then the player inputs "I said shake!" with the speech input device.

A time limit is disposed on the game screen 70 (FIG. 4 or 5). Thus, it is necessary for the player to complete the selection (determination) of the option by properly inputting, within the time limit, one of the strings (input criteria) of the options using the character input device or the speech input device.

Next, the processing in the game device 10, and particularly the processing relating to the present invention, will be described. The processing described below is realized by the game program being executed in the game device 10.

Figure 6:
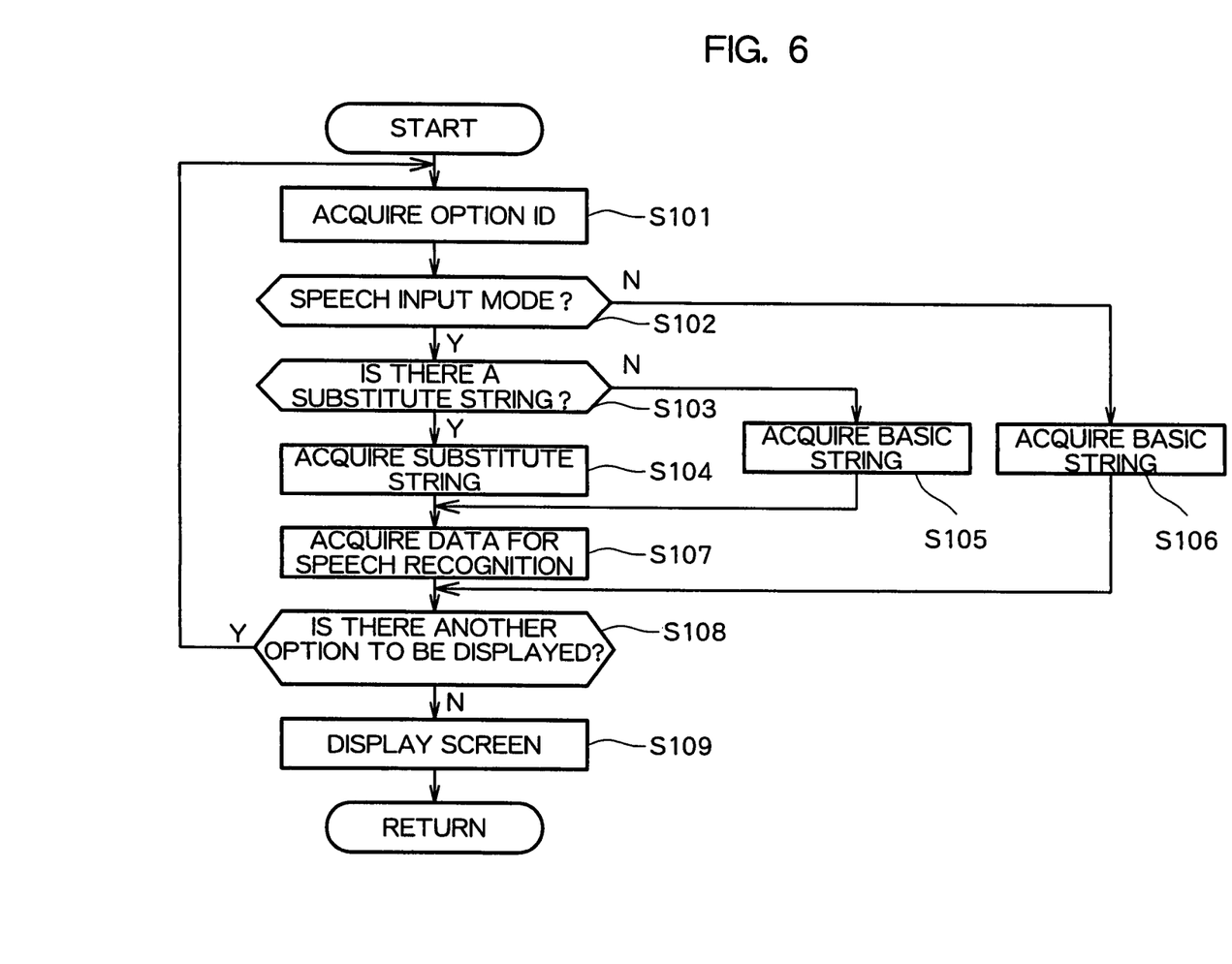
FIG. 6 is a flow chart showing processing in the game device of the embodiment of the present invention.

FIG. 6 shows processing for displaying the game screen 70 (FIG. 4 or 5). As shown in FIG. 6, in this processing, first the option ID of an option to be displayed on the game screen 70 (when there are plural option IDs, the first ID) is acquired (S101). The present embodiment is configured so that the option ID of the display target is stored per game screen, and the option ID is acquired on the basis of this. Next, it is determined whether or not the input mode is the speech input mode (S102). Namely, the priority input device information is acquired. Because the present embodiment is configured so that the setting of the input mode is done on the game environment setting screen, whether or not the input mode is the speech input mode is acquired on the basis of the setting content. When the input mode is not the speech input mode, i.e., when the input mode is the character input mode, the basic string of the option ID (below, target option ID) acquired in S101 is acquired from the option information table (FIG. 3) (S106).

When the input mode is the speech input mode, whether or not a substitute string has been registered in regard to the target option ID is determined on the basis of the option information table (S103) When no substitute string has been registered, the basic string of the target option ID is acquired from the option information table (S105). When a substitute string has been registered, that substitute string is acquired from the option information table (S104). In this case, the speech recognition data are also acquired (S107). Then, it is determined whether or not there are other options to be displayed on the game screen 70 (S108). When there are other options, the next option ID is acquired in S101, and the processing of S102 to S107 is similarly executed. In this manner, the processing of S101 to S107 is executed in regard to all options to be displayed on the game screen 70.

Then, the game screen 70 is displayed (S109). In the case of the character input mode, display of the options (input criteria) is conducted on the basis of the basic strings acquired in S106. In the case of the speech input mode, display of the options (input criteria) is conducted on the basis of the basic strings acquired in S105 or the substitute strings acquired in S104. In this case, the data for speech recognition acquired in S107 are read in the main memory 26. Then, the processing ends.

Figure 7:
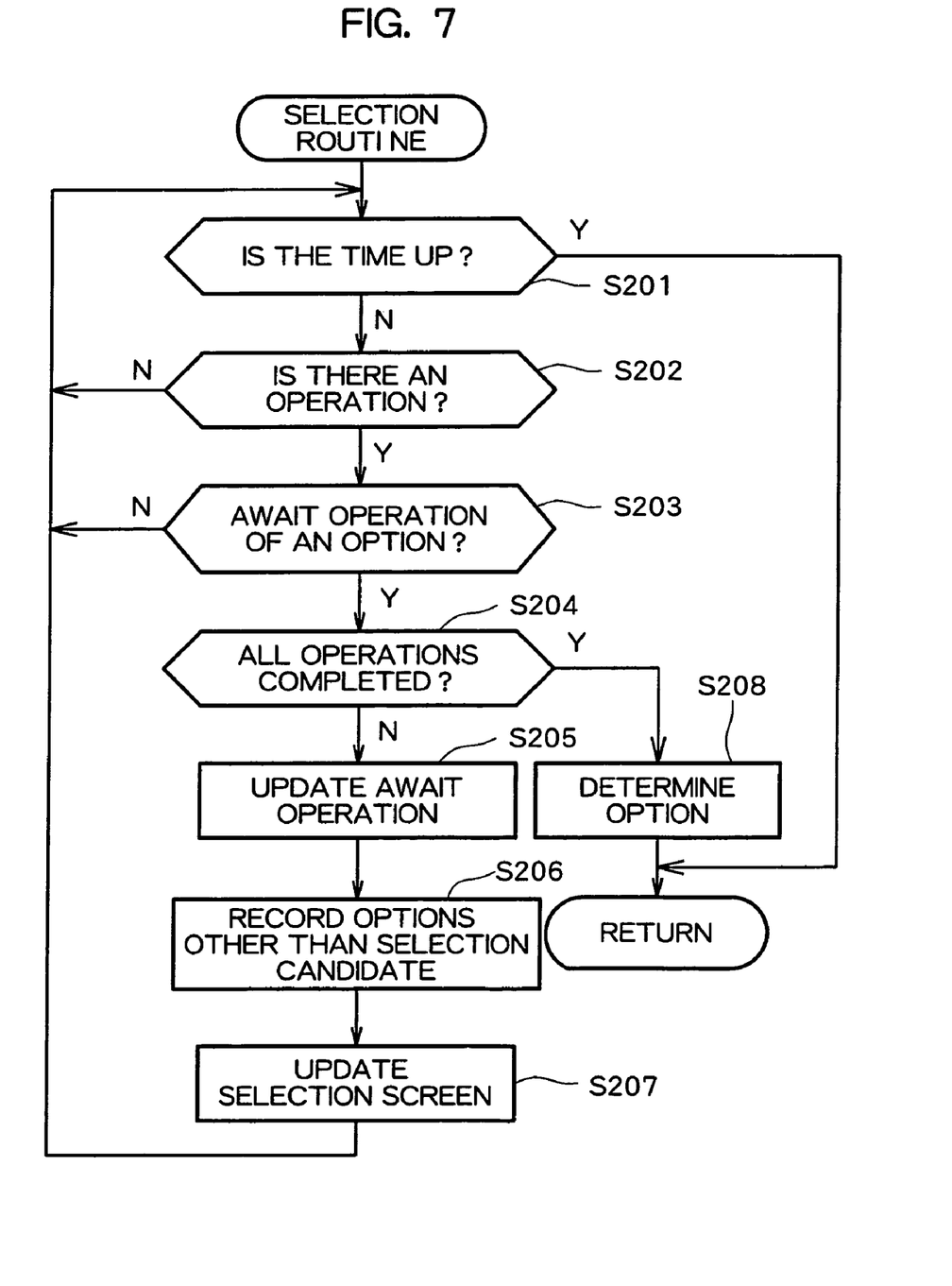
FIG. 7 is a flow chart showing processing in the game device of the embodiment of the present invention.
Figure 8:
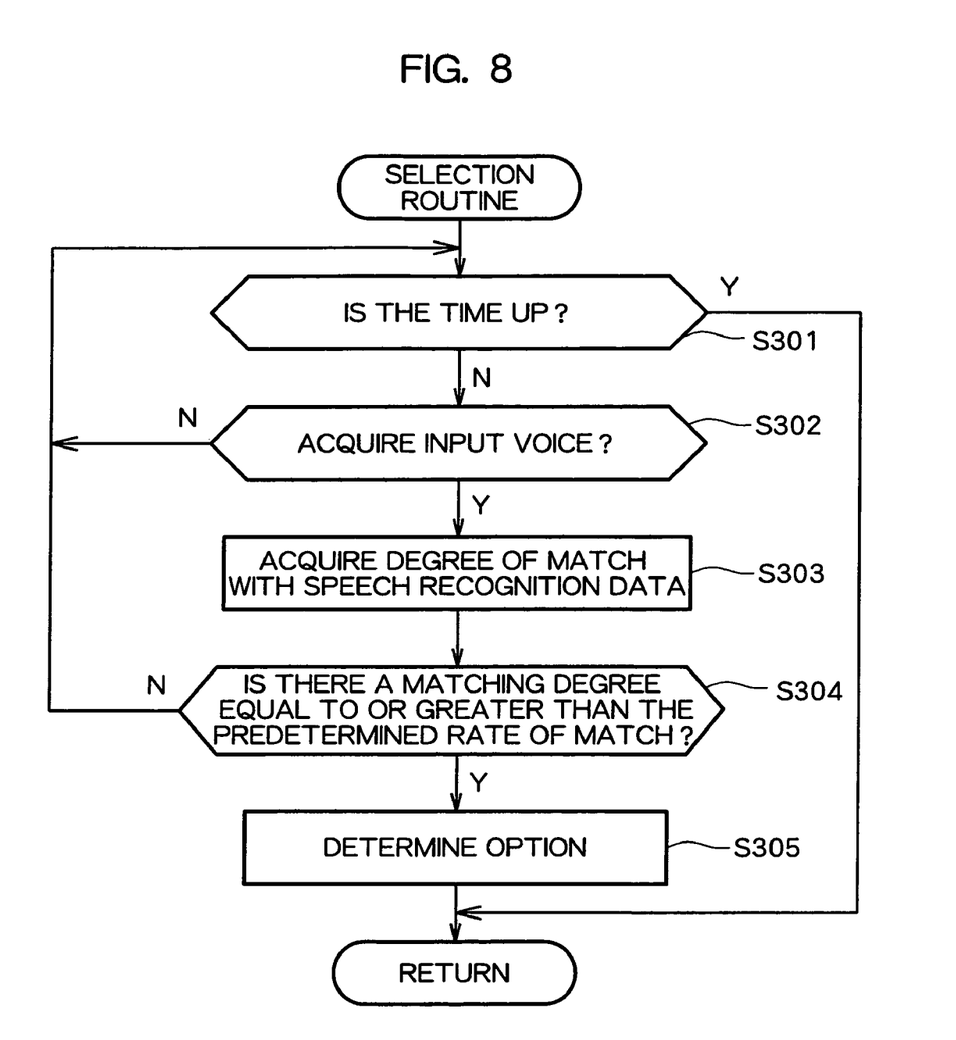
FIG. 8 is a flow chart showing processing in the game device of the embodiment of the present invention.

Next, the selection processing on the game screen 70 will be described. FIGS. 7 and 8 show the selection processing on the game screen 70. FIG. 7 shows selection processing in the character input mode, and FIG. 8 shows selection processing in the speech input mode.

As shown in FIG. 7, in the selection processing in the character input mode, it is determined whether or not the time for making the selection is up (whether or not the time is within the time limit) (S201). When it is determined that the time is up (the time limit has passed), the processing ends. When it is determined that the time is within the time limit, it is determined whether or not an operation has been executed by the player (S202). When an operation has not been executed, monitoring is continued in regard to whether or not the time is up (S201) and whether or not an operation has been done (S202).

When an operation has been done, it is determined whether or not the operation is an await operation of an option (S203). Here, await operation is an operation inputting the first characters of part of a selection candidate excluding the already-inputted part. When the first characters of an option have-not yet been inputted, the operation inputting the first characters of all options becomes an await operation. By selection candidate is meant an option whose prefix matches that of the already-inputted string. The present embodiment is configured so that only the non-inputted part of the selection candidate is displayed on the game screen 70 (selection screen). When the operation is not an await operation of an option, monitoring is done in regard to whether or not the time is up (S201) and whether or not an operation has been done (S202).

When the operation is an await operation of an option, it is determined whether or not all operations have ended (S204). "All operations ended" refers to a state where all characters have been properly inputted in regard to a option. When all operations have not ended, the await operation is updated (S205). Here, a selection candidate is first determined. Namely, an option whose prefix matches that of the already-inputted string serves as the selection candidate. Then, the await operation is updated to an operation inputting the first characters (the characters to be inputted next) of the selection candidate excluding the already-inputted part.

Next, an option other than the selection candidate is recorded (S206). Namely, the selection candidate whose prefix matches that of the already-inputted string is recorded. Then, the selection screen is updated (S207). The selection screen is updated so that display of options other than the selection candidate is limited on the basis of the information recorded in S206. The selection screen is also updated so that only the non-inputted part is displayed in regard to the selection candidate. Then, monitoring is done in regard to whether or not the time is up (S201) and whether or not an operation has been done (S202).

When it is determined in S204 that all operations have ended, the option for which all characters have been inputted is determined to be the option selected by the player (S208), and the processing ends.

As shown in FIG. 8, in the selection processing in the speech input mode, it is determined whether or not the time is up (whether or not the time is within the time limit) (S301). When it is determined that the time is up (the time limit has passed), the processing ends. When it is determined that the time is within the time limit, it is determined whether or not an input voice has been acquired (S302). When an input voice has not been acquired, monitoring of whether or not the time is up (S301) and whether or not an input voice has been acquired (S302) is continued.

When an input voice has been acquired, the degree to which the input voice matches the speech recognition data corresponding to each option is acquired (S303). The matching degree is acquired by comparing the input voice data with the audio data read in the main memory 26. Next, it is determined whether there is a matching degree equal to or greater than a predetermined matching degree in regard to each matching degree acquired in step S303 (S304). When there is no matching degree equal to or greater than the predetermined matching degree, monitoring of whether or not the time is up (S301) and whether or not an input voice has been acquired (S302) is continued.

When there is a matching degree equal to or greater than the predetermined matching degree, then the option corresponding to the speech recognition data of that matching degree is determined to be the option selected by the player (S305). When there are plural matching degrees equal to or greater than the predetermined matching degree, the processing may be configured so that the option corresponding to the speech recognition data with the higher matching degree is determined to be the option selected by the player. The processing may also be configured so that, similar to the case where there-is no matching degree equal to or greater than the predetermined matching degree because one option cannot be identified, monitoring of whether or not the time is up (S301) and whether or not an input voice has been acquired (S302) continues, or speech input may again be prompted of the player.

As described-above, according to the game device 10 of the present embodiment, in regard to predetermined options, basic strings and substitute strings are stored and speech recognition data corresponding to the substitute strings are stored. Additionally, in the speech input mode, the substitute strings are displayed as options in place of the basic strings in regard to the predetermined options. For this reason, when using a speech input device (in the speech input mode), options more suited to speech input can be displayed instead of options not suited to speech input. By configuring the invention in this manner, for example, during speech input, options more suited to speech recognition can be displayed in regard to options not suited to speech recognition, such as the speech recognition rate becoming lower due to the length of the string being short.

The present invention is not limited to the above embodiment.

For example, the invention may also be configured so that the display font size of the options (input criteria) is changed in accordance with the input mode (priority input device information) on the game screen 70. For example, the invention may also be configured so that the font size is changed between the character input mode and the speech input mode. By configuring the invention in this manner, the display font size of the options can made to suit the features (characteristics) of the input mode. For example, when the predetermined input mode is configured in view of younger players, the option display font size in the predetermined input mode can be made larger.

The invention may also be configured so that, for example, the probability of predetermined game events is controlled in accordance with the input mode (on the basis of the priority input device information). Here, the game events may be mini-games occurring in the game, for example. By configuring the invention in this manner, the probability of game events can be changed in accordance with the features (characteristics) of the input device. For example, the probability of mini-games that are difficult to adapt to a speech input device can be lowered (e.g., so that they do not occur at all) in the speech input mode.

The above description was in regard to an example where the invention was implemented using the home-use game device 11, but the invention is similarly applicable to a commercial-use game device. In this case, it is preferable to use a higher-speed memory device in place of the DVD 25 and integrally form the monitor 18 and the speaker 22.

Figure 9:
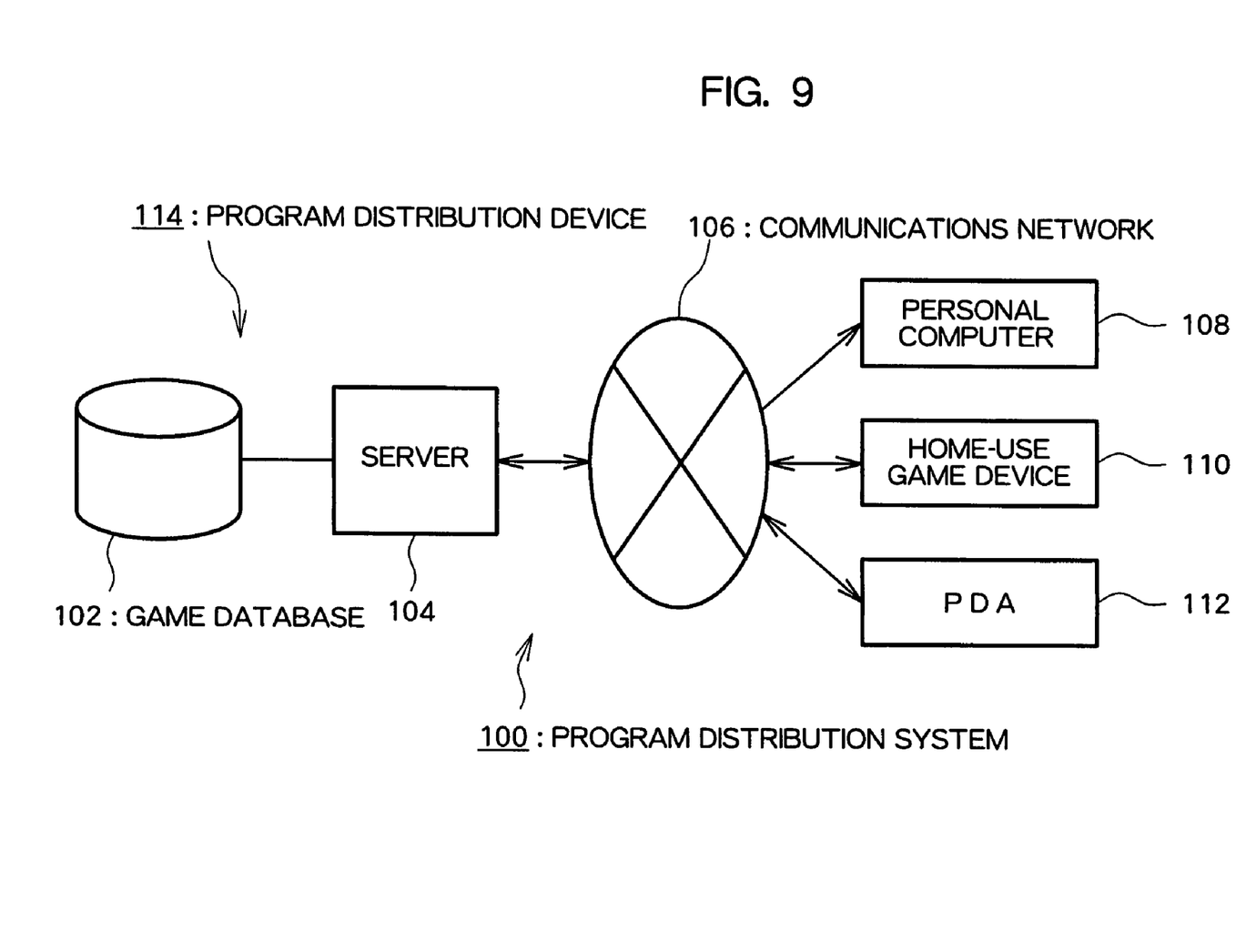
FIG. 9 is a diagram showing the overall configuration of a program distribution system of another embodiment of the present invention.

Moreover, in the above description, the program was supplied from the DVD 25, which is an information storage medium, to the home-use game device 46, but the program may also be distributed to homes and the like via a communications network. FIG. 9 is a diagram showing the overall configuration of a program distribution system using a communications network. A program distribution method of the invention will now be described on the basis of FIG. 9. As shown in FIG. 9, a program distribution system 100 includes a game database 102 (information storage medium), a server 104, a communications network 106, a personal computer 108, a home-use game device 110 and a PDA (portable information terminal) 112. Of these, a program distribution device 114 is configured by the database 102 and the server 104. The communications network 106 includes, for example, the Internet and cable television networks. In this system, the same program as that stored on the DVD 25 is stored in the game database 102. Consumers request distribution of the game using the personal computer 108, the home-use game device 110 or the PDA 112, whereby this request is conveyed to the server 104 via the communications network 106. Then, the server 104 reads the program from the game database 102 in response to the game distribution request, and transmits the game to the game distribution requester, such as the personal computer 108, the home-use game device 110 or the PDA 112. Here, the program distribution method is configured so that the game is distributed in response to the game distribution request, but the program distribution method may also be configured so that the game is transmitted unilaterally from the server 104. Also, it is not invariably necessary for all programs necessary to realize the game to be distributed at once (all-at-once distribution); the program distribution method may be configured so that the necessary portions are distributed in response to the stages of the game (partial distribution). By configuring the program distribution method in this manner, so that the game is distributed via the communications network 106, consumers can easily acquire the program.

INDUSTRIAL APPLICABILITY

As described above, according to the present invention, when the priority input device information represents a speech input device, in regard to predetermined character input criteria, the speech input criteria corresponding to the character input criteria are displayed as the input criteria, and determination with respect to the input can be done on the basis of the speech recognition data corresponding to the speech input criteria. By configuring the invention in this manner, input criteria more suited to speech input can be displayed in place of input criteria not suited to speech input at the time of speech input.

The invention claimed is:

1. A nurture simulation game device which displays input strings on a game screen as options whereby the player selects the options using one of a character input device and a speech input device, the nurture simulation game device comprising:

basic string storage means for storing a plurality of basic strings;

substitute string storage means for storing a substitute string corresponding to each of at least one of the plurality of basic strings stored in the basic string storage means when the basic string is not suited for speech recognition and have potential to lead to a drop in speech recognition rate;

speech recognition data storage means which, stores speech recognition data corresponding to the basic string when the substitute string corresponding to the basic strings has not been stored in the substitute string storage means, and stores speech recognition data corresponding to the substitute string when the substitute string corresponding to the basic strings has been stored in the substitute string storage means, priority input device information acquisition means for acquiring priority input device information;

input criteria display means which, when the priority input device information acquired by the priority input device information acquisition means indicates that a character input device is selected, displays, as input criteria, the basic strings corresponding to a target option ID are stored in the basic string storage means, and when the priority input device information acquired by the priority input device information acquisition means indicates that a speech input device is selected, determines the substitute string corresponding to the target option ID is stored in the substitute string storage means, and if the substitute string is present, the input criteria display means displays the substitute string as the input criteria and if the substitute string is not present, displays the basic string as the input criteria;

determination means which, when the priority input device information acquired by the priority input device information acquisition means indicates that the character input device is selected, determines whether or not the input thereof corresponds to the input criteria displayed by the input criteria display means, and when the priority input device information acquired by the priority input device information acquisition means indicates that the speech input device is selected, determines whether or not the input thereof corresponds to the speech recognition data correlated with the input criteria displayed by the input criteria display means; and control means for controlling the game on a basis of the result of determination by the determination means, wherein the basic strings and the substitute strings are different and the substitute string comprises the basic string and an additional string attached to the corresponding basic string, and wherein the nurture simulation game device stores an option information table in which a plurality of target option IDs, the basic strings, the substitute strings and the speech recognition data are correlated, wherein when the speech input device is selected, whether or not the substitute string corresponding to the target option ID is registered in the option information table is determined; and
when there is no substitute string registered in the option information table, the basic string and the speech recognition data corresponding to the target option ID is used and
when the substitute string is registered in the option information table, the substitute string and speech recognition data corresponding to the target option ID is used.

2. The game device of claim 1, wherein
the input criteria display means displays, as the input criteria, the basic strings or the substitute strings in a font size according to the priority input device information acquired by the priority input device information acquisition means.

3. The game device of claim 1 or 2, wherein
the control means comprises means for controlling the probability of predetermined game events on the basis of the priority input device information acquired by the priority input device information acquisition means.

4. The game device as in any one of claims 1 and 2 wherein the game device is connectable to the character input device and the speech input device.

5. The game device of claim 1, wherein the substitute string is configured by having a string attached to a corresponding basic string.

6. The nurture simulation game device according to claim 1, wherein the substitute strings comprise plural repetitions of the basic strings.

7. The nurture simulation game device according to claim 1, wherein the substitute strings comprise a name attached to the basic strings.

8. The nurture simulation game device according to claim 1, wherein each of the option IDs that are stored in the option information table correspond to a different display on the game screen.

9. The nurture simulation game device according to claim 1, when the input mode is the character input mode, the basic string corresponding to the target option ID is acquired from one of the plurality of target option IDs in the option information table.

10. A control method for a nurture simulation game device which displays input strings on a game screen as options whereby the player selects the options using one of a character input device and a speech input device, the control method comprising:
storing a plurality of basic strings in a basic string storage unit;
storing a substitute string, corresponding to each of at least one of the plurality of basic strings stored in the basic strings storage unit, in substitute string storage unit when the basic string is not suited for speech recognition and have potential to lead to a drop in speech recognition rate;
storing speech recognition data corresponding to the basic string in the speech recognition data storage unit when the substitute string corresponding to basic strings has not been stored in the substitute string storage unit,
and storing speech recognition data corresponding to the substitute string in the speech recognition data storage unit when the substitute string corresponding to the basic strings has been stored in the substitute string storage unit, acquiring priority input device information by a priority input device information acquisition unit;
displaying, on display unit, input criteria, wherein when the priority input device information acquired by the priority input device information acquisition unit indicates that the character input device is selected, the basic strings stored in the basic string storage unit is displayed as the input criteria and
when the priority input device information acquired by the priority input device information acquisition unit indicates that the speech input device is selected, determining the substitute string corresponding to a target option is stored in the substitute string storage unit, and if the substitute string is present, displaying the substitute string as the input criteria and if the substitute string is not present, displaying the basic string as the input criteria,
determining whether or not user input through the character input device corresponds to the input criteria displayed on the display unit and controlling a game on a basis of the determination result; and
determining whether or not user input through the speech input device corresponds to speech recognition data corresponding to the input criteria, displayed on the display unit, and controlling the game on a basis of the determination result, wherein
the basic strings and the substitute strings are different and the substitute string comprises the basic string and an additional string attached to the corresponding basic string, and
wherein the nurture simulation game device stores an option information table in which a plurality of target option IDs, the basic strings, the substitute strings and the speech recognition data are correlated,
wherein when the speech input device is selected, whether or not the substitute string corresponding to the target option ID is registered in the option information table is determined; and
when there is no substitute string registered in the option information table, the basic string and the speech recognition data corresponding to the target option ID is used and
when the substitute string is registered in the option information table, the substitute string and speech recognition data corresponding to the target option ID is used.

11. A program distribution device comprising an information storage medium in which is recorded the program for having a computer function as a nurture simulation game device which displays input strings on a game screen as options whereby the player selects the options using one of a character input device and a speech input device, wherein the program distribution device reads the program from the information storage medium, and distributes the program, the program comprising instruction for causing a computer to:
store a plurality of basic strings basic string storage unit;
store a substitute string corresponding to each of at least one of the plurality of basic strings stored in the basic string storage unit in the substitute string storage unit when the basic string is not suited for speech recognition and have potential to lead to a drop in speech recognition rate;
store speech recognition data corresponding to the basic string in the speech recognition data storage unit when the substitute string corresponding to the basic strings has not been stored in the substitute string storage unit, and store speech recognition data corresponding to the substitute string in the speech recognition data storage unit when the substitute string corresponding to the basic strings has been stored in the substitute string storage unit, acquire priority input device information by priority input device information acquisition unit;

display, on display unit, input criteria, wherein when the priority input device information acquired by the priority input device information acquisition unit indicates that the character input device is selected, the basic strings stored in the basic string storage unit is displayed as the input criteria and when the priority input device information acquired by the priority input device information acquisition unit indicates that the speech input device is selected, determines the substitute string corresponding to a target option is stored in the substitute string storage means, and if the substitute string is present, the input criteria display means displays the substitute string as the input criteria and if the substitute string is not present, displays the basic string as the input criteria, determine whether or not user input through the character input device corresponds to the input criteria displayed on the display unit, and control a game on a basis of the determination result; and determine whether or not user input through the speech input device corresponds to speech recognition data corresponding to the input criteria displayed on the display unit, and control the game on a basis of the determination result, wherein the basic strings and the substitute strings are different and the substitute string comprises the basic string and an additional string attached to the corresponding basic string, and wherein the nurture simulation game device stores an option information table in which a plurality of target option IDs, the basic strings, the substitute strings and the speech recognition data are correlated, wherein when the speech input device is selected, whether or not the substitute string corresponding to the target option ID is registered in the option information table is determined; and when there is no substitute string registered in the option information table the basic string and the speech recognition data corresponding to the target option ID is used and when the substitute string is registered in the option information table, the substitute string and speech recognition data corresponding to the target option ID is used.

12. A computer-readable information storage medium in which is stored a program for having a computer to function as a nurture simulation game device which displays input strings on a game screen as options whereby the player selects the options using one of a character input device and a speech input device, comprising:

storing a plurality of basic strings in a basic string storage unit;

storing a substitute string, corresponding to each of at least one of the plurality of basic strings stored in the basic strings storage unit, in substitute string storage unit when the basic string is not suited for speech recognition and have potential to lead to a drop in speech recognition rate;

storing speech recognition data corresponding to the basic string in the speech recognition data storage unit when the substitute string corresponding to basic strings has not been stored in the substitute string storage unit, and storing speech recognition data corresponding to the substitute string in the speech recognition data storage unit when the substitute string corresponding to the basic strings has been stored in the substitute string storage unit;

acquiring priority input device information by a priority input device information acquisition unit;

displaying, on display unit, input criteria, wherein when the priority input device information acquired by the priority input device information acquisition unit indicates that the character input device is selected, the basic strings stored in the basic string storage unit is displayed as the input criteria and when the priority input device information acquired by the priority input device information acquisition unit indicates that the speech input device is selected, determining the substitute string corresponding to a target option is stored in the substitute string storage unit, and if the substitute string is present, displaying the substitute string as the input criteria and if the substitute string is not present, displaying the basic string as the input criteria;

determining whether or not user input through the character input device corresponds to the input criteria displayed on the display unit, and controlling a game on a basis of the determination result; and determining whether or not user input through the speech input device corresponds to speech recognition data corresponding to the input criteria displayed on the display unit, and controlling the game on a basis of the determination result, wherein the basic strings and the substitute strings are different and the substitute string comprises the basic string and an additional string attached to the corresponding basic string, and wherein the nurture simulation game device stores an option information table in which a plurality of target option IDs, the basic strings, the substitute strings and the speech recognition data are correlated, wherein when the speech input device is selected, whether or not the substitute string corresponding to the target option ID is registered in the option information table is determined: and when there is no substitute string registered in the option information table, the basic string and the speech recognition data corresponding to the target option ID is used and when the substitute string is registered in the option information table, the substitute string and speech recognition data corresponding to the target option ID is used.

13. A nurture simulation game device which displays input strings on a game screen as options whereby the player selects the options using one of a character input device and a speech input device, the nurture simulation game device comprising:

basic string storage means for storing a plurality of basic strings;

substitute string storage means for storing a substitute string corresponding to each of at least one of the plurality of basic strings stored in the basic string storage means when the basic string is not suited for speech recognition and have potential to lead to a drop in speech recognition rate;

speech recognition data storage means which, stores speech recognition data corresponding to the basic string when the substitute string corresponding to the basic strings has not been stored in the substitute string storage means, and stores speech recognition data corresponding to the substitute string when the substitute string corresponding to the basic strings has been stored in the substitute string storage means, priority input device information acquisition means for acquiring priority input device information;

input criteria display means which, when the priority input device information acquired by the priority input device information acquisition means indicates that the character input device is selected, displays, as input criteria, the basic strings stored in the basic string storage means, and when the priority input device information acquired by the priority input device information acquisition means indicates that the speech input device is selected, determines the substitute string corresponding to a target option is stored in the substitute string storage means, and if the substitute string is present, the input criteria display means displays the substitute string as the input criteria and if the substitute string is not present, displays the basic string as the input criteria;

determination means which, when the priority input device information acquired by the priority input device information acquisition means indicates that the character input device is selected, determines whether or not the input thereof corresponds to the input criteria displayed by the input criteria display means, and when the priority input device information acquired by the priority input device information acquisition means indicates that the speech input device is selected, determines whether or not the input thereof corresponds to the speech recognition data correlated with the input criteria displayed by the input criteria display means; and control means for controlling the game on a basis of the result of determination by the determination means, wherein the control means comprises means for controlling the probability of predetermined game events on the basis of the priority input device information acquired by the priority input device information acquisition means and the game device is connectable to the character input device and the speech input device, wherein the basic strings and the substitute strings are different and the substitute string comprises the basic string and an additional string attached to the corresponding basic string, and wherein the nurture simulation game device stores an option information table in which a plurality of target option IDs, the basic strings, the substitute strings and the speech recognition data are correlated, wherein when the speech input device is selected, whether or not the substitute string corresponding to the target option ID is registered in the option information table is determined; and when there is no substitute string registered in the option information table, the basic string and the speech recognition data corresponding to the target option ID is used and when the substitute string is registered in the option information table, the substitute string and speech recognition data corresponding to the target option ID is used.

\* \* \* \* \*